United States Patent
Carothers et al.

(10) Patent No.: US 9,971,148 B2
(45) Date of Patent: May 15, 2018

(54) COMPACT WEDGE PRISM BEAM STEERING

(71) Applicant: TEXAS INSTRUMENTS INCORPORATED, Dallas, TX (US)

(72) Inventors: Daniel N. Carothers, Lucas, TX (US); Stephen J. Fedigan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 161 days.

(21) Appl. No.: 14/957,284

(22) Filed: Dec. 2, 2015

(65) Prior Publication Data
US 2017/0160541 A1    Jun. 8, 2017

(51) Int. Cl.
*G02B 5/04*    (2006.01)
*G02B 26/10*    (2006.01)
*G01D 5/14*    (2006.01)
*G01S 7/481*    (2006.01)
*G02B 7/18*    (2006.01)
*G02B 17/08*    (2006.01)
*G02B 26/08*    (2006.01)

(52) U.S. Cl.
CPC ............ *G02B 26/108* (2013.01); *G01D 5/145* (2013.01); *G01S 7/4813* (2013.01); *G02B 5/04* (2013.01); *G02B 7/1805* (2013.01); *G02B 17/08* (2013.01); *G02B 26/0891* (2013.01); *G02F 2201/58* (2013.01); *G02F 2203/24* (2013.01)

(58) Field of Classification Search
CPC ............... G02B 26/08; G02B 26/0883; G02B 26/0891; G02B 5/04

USPC ........ 250/216, 239; 359/211.1, 211.2, 211.3, 359/211.5
See application file for complete search history.

(56) References Cited

U.S. PATENT DOCUMENTS

| 5,610,771 | A  |   | 3/1997 | Sigler |
| 6,343,767 | B1 |   | 2/2002 | Sparrold et al. |
| 7,236,299 | B1 |   | 6/2007 | Smith |
| 8,400,700 | B2 | * | 3/2013 | Adams ................. G02B 7/1805 359/209.1 |

(Continued)

OTHER PUBLICATIONS

International Search Report for PCT/US2016/064852 dated Apr. 6, 2017.

(Continued)

*Primary Examiner* — Kevin Pyo
(74) *Attorney, Agent, or Firm* — Michael A. Davis, Jr.; Charles A. Brill; Frank D. Cimino

(57) ABSTRACT

A beam steering device includes a housing and a transceiver that emits and receives light beams through at least one opening in the housing. A rotator includes a cylindrical body rotatably mounted within the housing axially between the transceiver and the at least one opening. A wedge-shaped prism is secured within the body and includes a first surface extending perpendicular to the axis and a second surface extending transverse to the axis. An encoder member and a drive member are provided on an outer surface of the body. Sensors are mounted to the housing to sense the encoder member and provide an encoder signal indicative of a rotational position of the prism about the axis. At least one drive element is mounted to the housing and applies force to the drive member to rotate the body and prism about the axis for steering light beams propagating through the prism.

16 Claims, 8 Drawing Sheets

(56) References Cited

U.S. PATENT DOCUMENTS

2007/0024978 A1     2/2007   Jackson et al.
2011/0043880 A1     2/2011   Adams et al.

OTHER PUBLICATIONS

Schwarze, C. et al., "Risley-Prism Based Compact Laser Beam Steering for IRCM, Laser Communications, and Laser Radar", Critical Technology, Sep. 2005.

* cited by examiner

COMPACT WEDGE PRISM BEAM STEERING

TECHNICAL FIELD

This disclosure relates generally to a LIDAR device and, in particular, relates to a compact beam steering system.

BACKGROUND

Laser technology can be used where it is desirable to determine the distance between two points. For example, LIDAR is a remote sensing technology that measures distance by illuminating a target with a laser and analyzing the reflected light returning from the target. This technology is useful in certain automotive and gaming applications, among others. In some LIDAR systems, one or more laser sources are positioned in a housing that rotates over a prescribed angle to obtain measurements within a desired field of view. A prism is associated with each laser source and multiple lasers are stacked atop one another, as are the accompanying prisms. Multiple photodetectors receive and process the incoming light reflected from the target. This configuration requires a lot of parts and is therefore bulky, costly, and prone to breakdown.

SUMMARY

This disclosure relates generally to beam steering, and specifically to a compact wedge prism beam steering device and method for optical beam steering.

One example provides a beam steering device that includes a housing having at least one opening at an end. A transceiver emits and receives light beams through the at least one opening. A rotator includes a cylindrical body rotatably mounted within the housing axially between the transceiver and the at least one opening. The body extends along an axis and defines a central passage therethrough. A wedge-shaped prism is secured to the body within the central passage and includes a first surface extending perpendicular to the axis and a second surface extending transverse to the axis. An encoder member and a drive member are provided on an outer surface of the body. An encoder sensor is mounted to the housing to sense the encoder member and provide an encoder signal indicative of a rotational position of the prism about the axis and an index signal as an absolute position reference. A drive element is mounted to the housing and arranged to apply motive force to the drive member to rotate the body and prism about the axis for steering a beam of light propagating through the prism.

Another example provides a beam steering device having a housing with at least one opening at an end. A transceiver emits and receives light beams through the at least one opening. A pair of wedge elements each includes a cylindrical body rotatably mounted within the housing. The body extends along an axis and defines a central passage therethrough. A wedge-shaped prism is secured to the body within the central passage. The prism has a first surface extending perpendicular to the axis and a second surface extending transverse to the axis. An encoder member and drive member are provided on an outer surface of the body. An encoder sensor is mounted to the housing to sense the encoder member and provide an encoder signal indicative of a rotational position of the prism about the axis and an index signal as an absolute position reference. A drive element is mounted to the housing and arranged to apply motive force to the drive member to rotate the body and prism about the axis for steering a beam of light propagating through the prism. The prisms are individually rotatable to steer beams through the housing and are free from radial overlap with each other relative to the centerline of the housing.

Yet another example provides a method for steering a beam that includes rotatably mounting a pair of wedge elements inside a housing. Each wedge element includes a cylindrical body extending along an axis and defining a central passage. A wedge-shaped prism is secured to the body within the central passage. The prism has a first surface extending perpendicular to the axis and a second surface extending transverse to the axis. A drive member and an encoder member are provided on an outer surface of the body. Drive elements are secured to the housing for rotating the prisms about the axis. Sensors are secured to the housing for sensing the rotational position of the prism about the axes. Light beams are emitted from a transceiver through both prisms. The prisms are rotated relative to the housing with the drive elements while simultaneously monitoring the position of the prisms with the sensors to steer the beam from the light source through the prisms. Reflected light is received at the transceiver from an object external to the housing.

DETAILED DESCRIPTION

Figure 1:
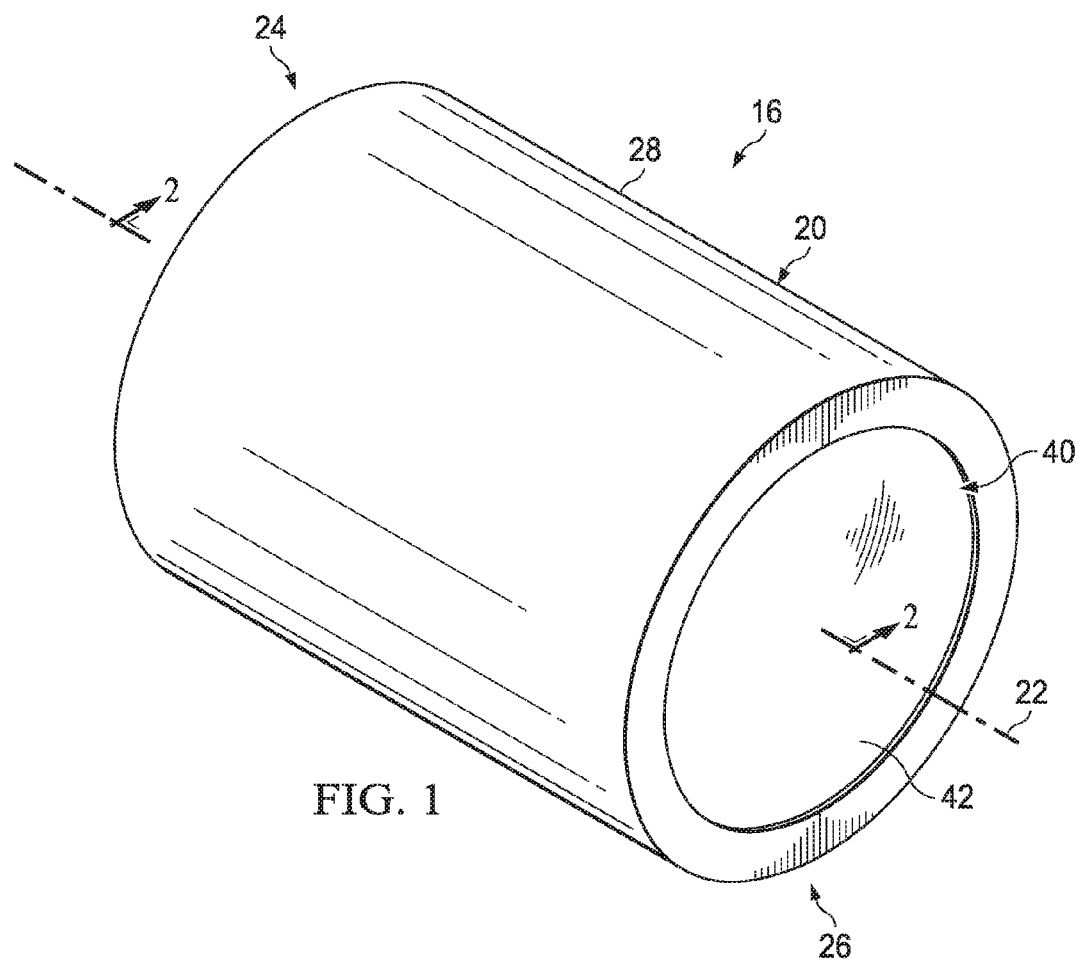
FIG. 1 illustrates an example beam steering device.
Figure 2:
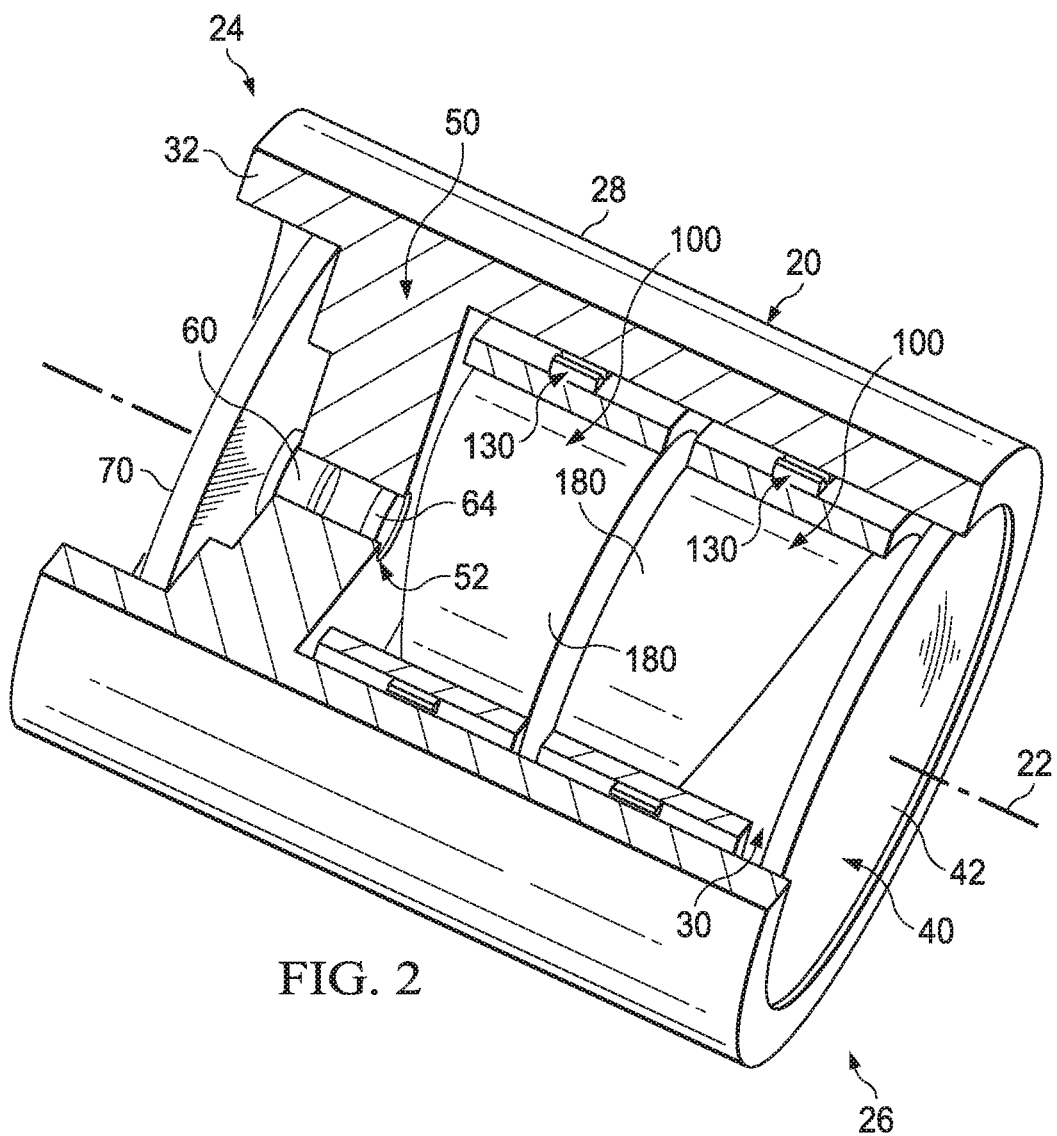
FIG. 2 illustrates a section view of the beam steering device of FIG. 1 taken along line 2-2.

This disclosure relates generally to a LIDAR device and, in particular, relates to a compact beam system. FIGS. 1-2 illustrate an example of a beam steering device 16 that emits and receives laser light to determine distances to objects spaced from the device. The beam steering device 16 includes a housing 20 extending along a centerline (central longitudinal axis) 22 from a first end 24 to a second end 26. The housing 20 could be a cast or extruded part. A sidewall 28 of the housing 20 defines a passage or cavity 30 extending along the centerline 22 from an opening 40 in the second end 26 towards the first end 24. A lens 42 is secured to the second end 24 within the opening 40. In one example (see FIG. 5), the lens 42 includes a planar surface 44 facing the passage 30 and a non-planar surface 46 facing outward. Other lens configurations could be utilized depending on the application requirements for the directing light with respect to the housing 20.

The passage 30 terminates at an end wall 32 at the first end 24 of the housing 20. An interior wall 50 extends parallel to the end wall 32 and through the passage 30. An opening 52 extends through the interior wall 50 along the centerline 22. The opening 52 receives a monolithic LIDAR transceiver 60 adjacent the first end 24. The transceiver 60 is configured to both emit and receive laser light (e.g., including a laser light source and a photodetector) along the centerline 22. The transceiver 60 is electrically connected to one or more interface boards (e.g., printed circuit boards) 70 provided in the passage 30 between the interior wall 50 and the end wall 32. The interface boards 70 are electrically connected to a data port/power connection 80 extending through the end wall 32. The interface boards 70 can include control electronics to operate the transceiver 60 according to application requirements.

In the example of FIGS. 1 and 2, a collimating lens 64 is also provided in the opening 52 along the centerline 22 between the transceiver 60 and the lens 42. The lens 64 includes a planar first surface 65 (see FIG. 5) extending perpendicular to the centerline 22 and facing the transceiver 60. A second surface 66 is curved outward towards the wedge elements 100. Each of the first and second surfaces 65, 66 can alternatively be planar, arcuate, conical, hemispherical or any other known lens shape.

A plurality of rotators or wedge elements 100 are positioned in the passage 30 between the lens 42 and the transceiver 60 for steering laser beams emitted by the transceiver. As shown in the example of FIG. 2, a pair of wedge elements 100 are rotatably mounted in the passage 30 coaxially along the centerline 22.

Figure 3:
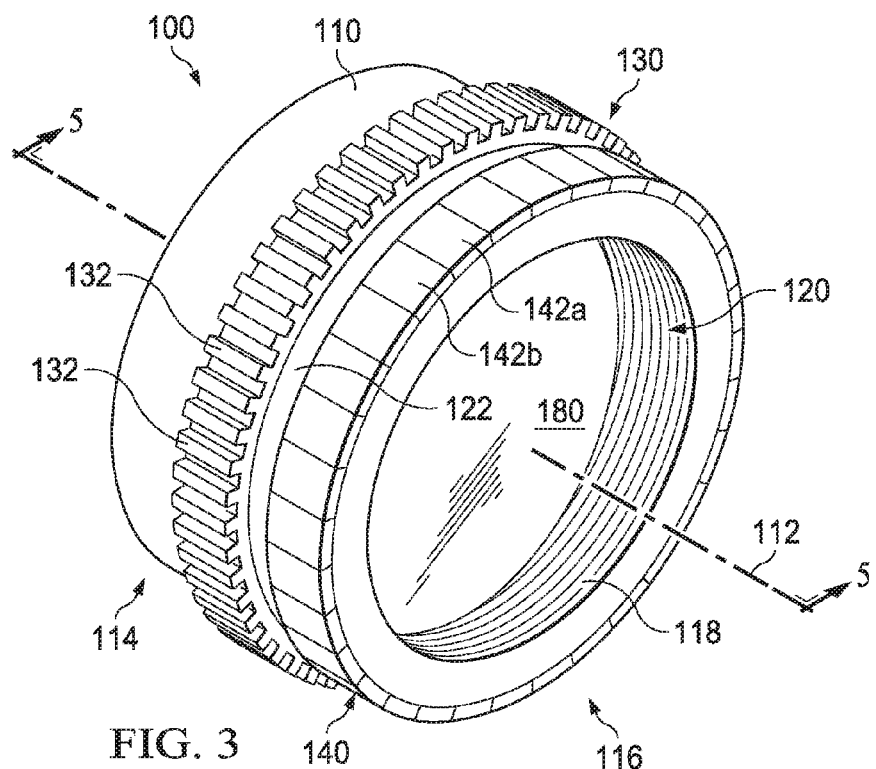
FIG. 3 illustrates an example wedge element for the beam steering device of FIG. 1.
Figure 4:
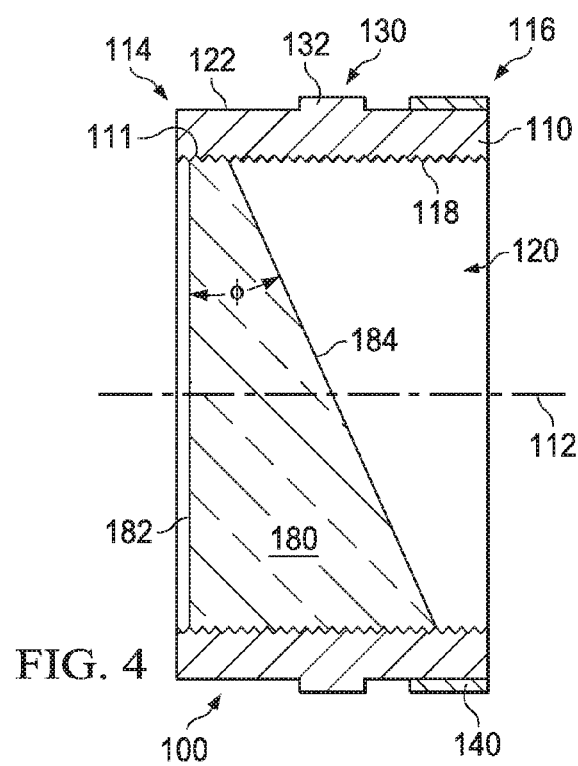
FIG. 4 illustrates a section view of the wedge element of FIG. 3 taken along line 4-4.

One example wedge element 100 is illustrated in FIGS. 3-4. The wedge element 100 includes a cylindrical body 110 that extends along an axis 112 from a first end 114 to a second end 116. The body 110 includes an inner sidewall surface 118 that defines a passage 120 extending along the axis 112 entirely through the body 110. The body 110 also includes a radially outer surface 122 extending about the axis 112 to define the circumference of the body.

The wedge element 100 includes a drive member 130 and an encoder member 140 provided on the outer surface 112 and extending around the entire circumference of the body 110. The drive member 130 is positioned near the longitudinal center of the wedge element 100 and is used to help rotate the wedge element about the axis 112. To this end, the drive member 130 can constitute a series of radially extending teeth 132 formed into the outer surface 122 of the body 110. Alternatively, the drive member 130 can constitute a magnetic strip with alternating north and south poles secured to or embedded in the outer surface 122. Additionally, one of the poles is extended longitudinally to form an index track which serves as an absolute position indicator.

An encoder member 140 is positioned at the second end 116 of the body 110 and helps determine and track the rotational position of the wedge element 100 about the axis 112. To this end, the encoder member 140 can constitute a magnetic strip secured to or embedded in the outer surface 122. In this construction, the encoder member 140 includes two tracks: an index track with either a north or south pole on the outer radius of the magnetic strip and a incremental track constituting a series of alternating magnets 142a, 142b phased 180° from one another. The index track is needed to provide an absolute reference position and generates one pulse per revolution (PPR) whereas the incremental track generates $N_p$ PPR, where $N_p$ is the number of poles along the strip circumference. Alternatively, the encoder member 140 can constitute a series of radially extending teeth formed into the outer surface 122 of the body 110 (not shown). To form two tracks in this case, one of the teeth would be extended longitudinally to create an index track.

While the example of FIGS. 3-4 depicts separate encoder and drive members 140 and 130, in other examples, the encoder member and the driver member can be implemented on the body 110 as a common structure (e.g., an annular array of alternating magnetic poles or teeth). Corresponding sensing and driving elements would thus be mounted in the associated housing 20 for sensing rotation and position thereof and for driving the wedge element about its axis.

Referring to FIG. 4, a wedge-shaped prism 180 is provided in the passage 120 of the body 110 and is secured to the inner surface 118. The prism 180 includes a first surface 182 and a second surface 184. Each of the first and second surfaces 182, 184 can be planar, arcuate, conical, hemispherical or any other known prism 180 shape. As shown, both of the surfaces 182, 184 are planar. The first and second surfaces 182, 184 extend at an angle 1 relative to one another.

The prism 180 can be secured to the inner surface 118 in a variety of ways. For example, as illustrated in FIG. 4, the prism 180 can be threaded to the inner surface 118, indicated at 111. Alternatively of additionally, the prism 180 can be retained in a recess formed in the inner surface by a retaining ring, set screw or adhesive (not shown). Regardless, the prism 180 is secured to the body 110 so as to be rotatable therewith. In any case, the prism 180 is oriented within the passage 120 such that the first surface 182 extends perpendicular to the axis 112 and the second surface 184 extends transverse to the axis. The first surface 182 can be positioned either at the first end 114 of the body 110 (as shown) or at the second end 116 (not shown). The second surface 184 is oriented at an angle $\varphi$ with respect to the first surface 182. While demonstrated as a planar surfaces, in other examples, one or both such surfaces 182 or 184 could be curved (e.g., concave or convex).

Figure 5:
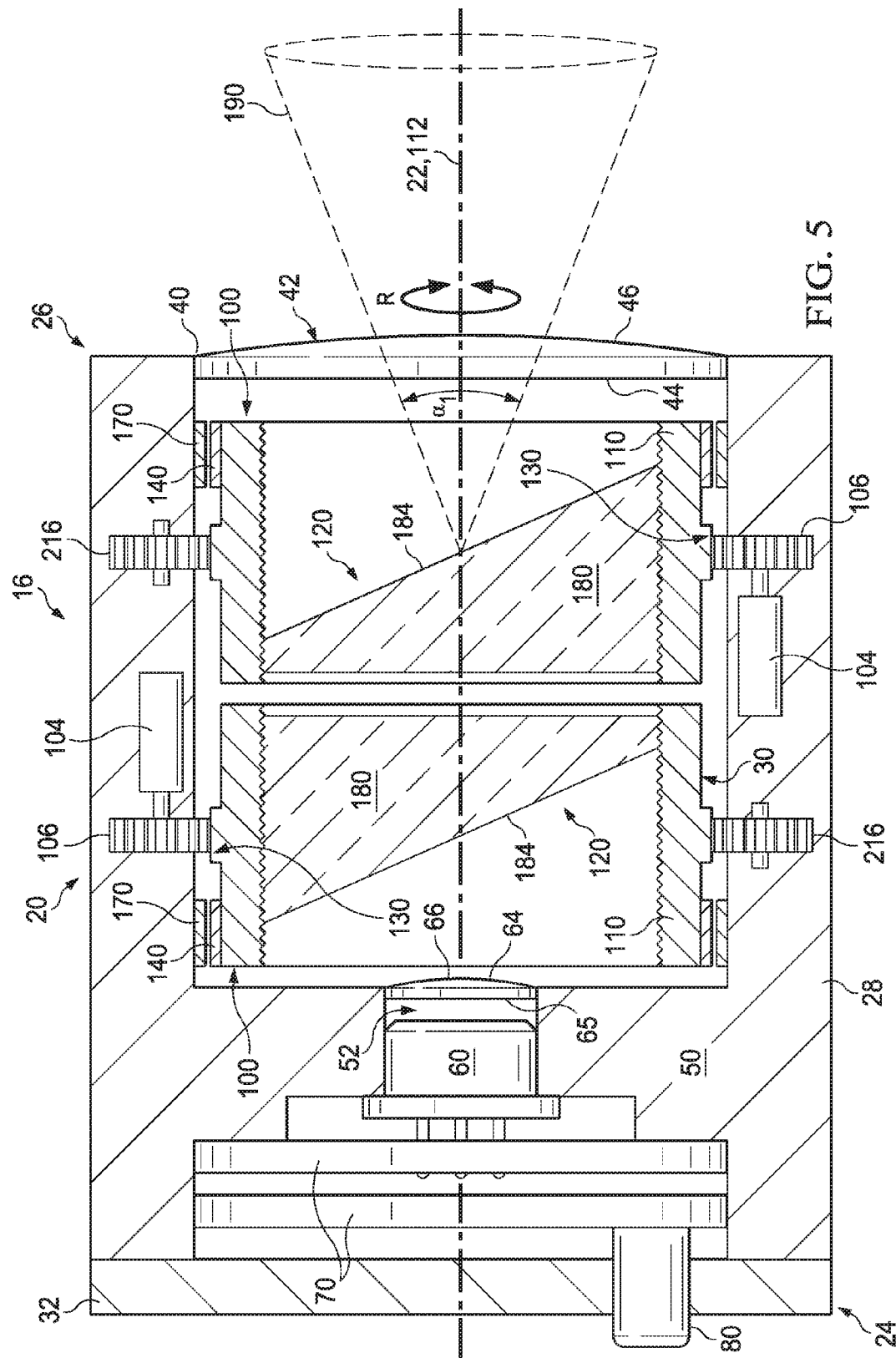
FIG. 5 illustrates a beam steering device that axially emits light.

As shown in the example of FIG. 5, a drive element 104 cooperates with the drive member 130 to rotate the wedge element 100 about the axis 112 in the direction indicated generally by the arrow R. In this example, the drive element 104 constitutes a motor that includes a gear 106 that engages the teeth 132 on the drive member 130 for rotating the wedge element 100 about the axis 112. The drive element 104 can be designed to rotate the wedge element 100 in only one direction R about the axis 112 or in both directions about the axis. In an alternative example construction when the drive member 130 is a magnetic strip with alternating poles (in place of teeth 132), the drive elements 104 constitute a plurality of drive coils arranged about the circumference of the wedge element 100 secured to the sidewall 28 radially outward of the drive member (not shown). Typically, the drive coils would be wound around a bonded ferromagnetic lamination stack which would have poles and a backiron to efficiency "conduct" the stator flux. In some examples, two or more drive coils can be used to start reliable rotation in a given direction. In other examples, three or more drive coils can be used to enable starting reliable rotation in both the clockwise and counterclockwise directions.

While the examples disclosed herein describe the drive elements 104 and drive members 130 as constituting motors that include permanent magnets or teeth on their rotors, other types of motors could be utilized. For example, motors could be implemented as switched reluctance motors or brushless DC motors. In such alternative examples, the encoder sensor and controls would be appropriately modified to operate the motors accordingly.

Figure 6A:
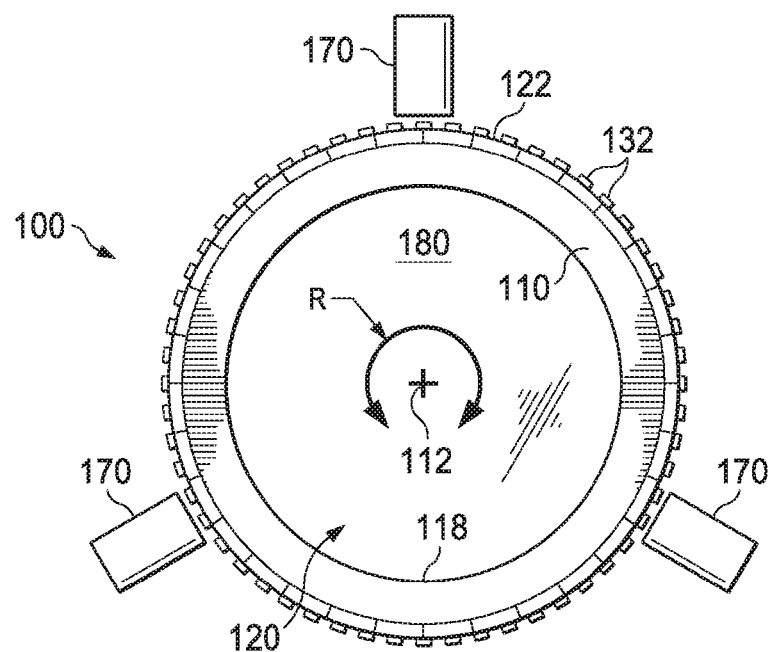
FIG. 6A illustrates one example sensor configuration for the wedge element.
Figure 6B:
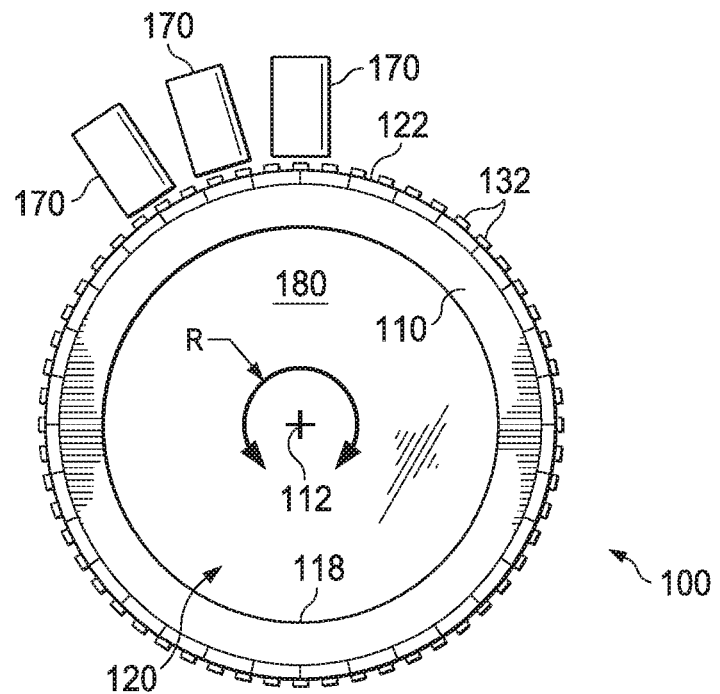
FIG. 6B illustrates another example sensor configuration for the wedge element.

FIGS. 6A and 6B depict examples configurations of encoder sensors that can be utilized. In the example of FIGS. 6A-6B, at least three sensors 170 are secured to the sidewall 28 within the cavity 30 and cooperate with the encoder member (e.g., teeth or poles) 140 to sense the rotational position of the wedge element 100 about the axis 112. In one example, the encoder member 140 acts as an encoder track to carry a code that is detected by sensors 170 for providing incremental and/or absolute position encoding of the wedge element 100.

When the encoder member 140 is a magnetic strip, for example, the sensors 170 are configured to detect magnetic poles arranged about the circumference of the wedge element 100. The magnetic sensors 170 can be, for example, a magneto-resistive or Hall Effect sensor. As shown in FIG. 6A, three sensors 170 ($S_a$, $S_b$, and $S_i$ configured ½ a pole pitch apart from one another, with $S_i$ coinciding with $S_a$) are provided that are symmetrically spaced about the circumference of the wedge element 100. Alternatively, the sensors 170 can be asymmetrically spaced (FIG. 6B) about the circumference of the wedge element 100. As another example, when the encoder member 140 is formed from teeth, the sensors 170 are inductive sensors (not shown) that track tooth movement to determine the rotational position of the wedge element 100 about the axis 112. In any case, although three sensors 170 are illustrated in this example, in other examples, more or fewer sensors can be implemented to sense the rotational position of the wedge element 100.

It will be appreciated that although separate members 130, 140 are shown the members 130, 140 could alternatively be formed as a single element secured to or formed integrally with the body 110. In this construction, the single element could have a collective width equal to the width of the drive and encoder members 130, 140 along the length of the body 110. The single element need only be wide enough in the direction of the axis 112 to allow both the drive element 104 and sensors 170 to simultaneously interact with the encoder member.

Referring back to FIG. 5, the pair of wedge elements 100 are rotatably mounted in the passage 30 with the axes 112 of the bodies 110 being coaxial with the centerline 22, i.e., the wedge elements are axially aligned along the centerline. The wedge elements 100 are also spaced entirely from one another in both the axial and radial directions along the centerline 22. No portion of one wedge element 100 radially overlaps a portion of the other wedge element 100. In other words, both ends 24, 26 of the rightmost wedge element 100 (as shown in FIG. 5) are positioned closer to the opening 40 than both ends 24, 26 of the leftmost wedge element 100. The wedge elements 100 therefore do not rotate within one another in use.

An idler gear 216 is provided radially between the sidewall 28 of the housing 20 and the teeth 232 diametrically opposed to the gear 106. This ensures that the wedge elements 100 are adequately centered and supported for rotation in the housing 20. The drive element 104 and gear 106 positioned radially outward of each wedge element 100 are secured to the sidewall 28 for rotating the wedge elements 100 about the axes 112. The wedge elements 100 can be rotated separately, simultaneously, in the same direction and/or in opposite directions. It will be appreciated that one or more additional idler gears 216 can be provided anywhere along the circumference of each body 110 and radially aligned with the teeth 232 on that body to help support the wedge element 100.

In operation, beam light from the transceiver 60 passes through the lens 64, through the prisms 180, and out of the opening 40 through the lens 42. After the light beams strike the target object(s), the light is collimated through the lens 42, passes through the prisms 180, through the lens 64, and ultimately reaches a photodector of the transceiver 60, where it is collected and processed.

The drive elements 104 positioned about each wedge element 100 can be actuated/energized by a computer (not shown) in order to rotate one or both wedge elements about the axes 112 and centerline 22 in the direction R. This results in rotation of the prisms 180 in the direction R, which changes the orientation of one or both second surfaces 184 on the prisms 180 relative to the beam path through the housing 20. The first surfaces 182 remain perpendicular to the centerline 22 regardless of the rotational position of the prisms 180. The prisms 180 can be rotated to a number of different positions relative to each other sufficient to generate a field of view for the beam steering device 16, illustrated by the cone 190 in FIG. 5. In one instance, the cone 190 extends over an angle $\alpha_1$ of about 20°. The beam steering device 16 can therefore capture and measure objects within the viewing cone 190.

Rotating each wedge element 100 about the axis can vary the relative angle of the second surfaces 184 to adjust the angle at which the laser light exits the respective wedge element. The wedge elements 100 can be rotated in any desired manner, e.g., individually, simultaneously, in the same direction, in opposite directions, etc., to achieve the desired light trajectory. Rotating one wedge element 100 in relation to the other will change the direction of the beam. When the prisms 180 angle in the same direction, the angle of the refracted beam becomes greater. When the prisms 180 are rotated in the direction R to angle in opposite directions, they cancel each other out, and the beam is allowed to pass straight through the prisms in a direction extending along/parallel to the centerline 22. During rotation, the axially aligned orientation of the wedge elements 100 results in the first or leftmost prism 180 directing the light from the transceiver 60 along one axis and the second or rightmost prism 180 directing the light from the transceiver along another axis. Consequently, the multiple wedge elements 100 produce a two-dimensional scanning pattern.

The gear 106, 216 between the housing 20 and each wedge element 100 can help stabilize and center the wedge element during rotation in the direction R to prevent inaccurate positioning thereof. When the drive elements 104 start and stop rotation of the wedge elements 100, there is a tendency for the wedge element to jerk, oscillate or wiggle. This negatively affects beam steering accuracy and, thus, it is desirable to ensure the wedge element 100 rotates with minimal oscillation. Consequently, gears 106, 216 and/or bearings (see, e.g., FIG. 8) can cooperate to maintain beam steering accuracy from the wedge element 100.

While the prisms 180 are rotated, the sensors 170 track rotational movement of the encoder members 140. The position can be absolute or relative but, in any case, the precise location of each prism 180 about the centerline 22 is known. The sensors 170 and drive elements 104 are in constant communication with one another via the computer (not shown) or the like. Consequently, the rotational position of each prism 180 can be precisely controlled and maintained during operation of the beam steering device 16.

The drive elements 104 and magnets 142a, 142b allow the prisms 180 to be rotated in the direction R in a microstep fashion. The resolution of this rotation is tied directly to pole pitch (mechanical spacing between the north and south pole centers) of the magnets 142a, 142b, e.g., the smaller and closer together the magnets, the more precise the rotational positioning of the prism 180.

Figure 7:
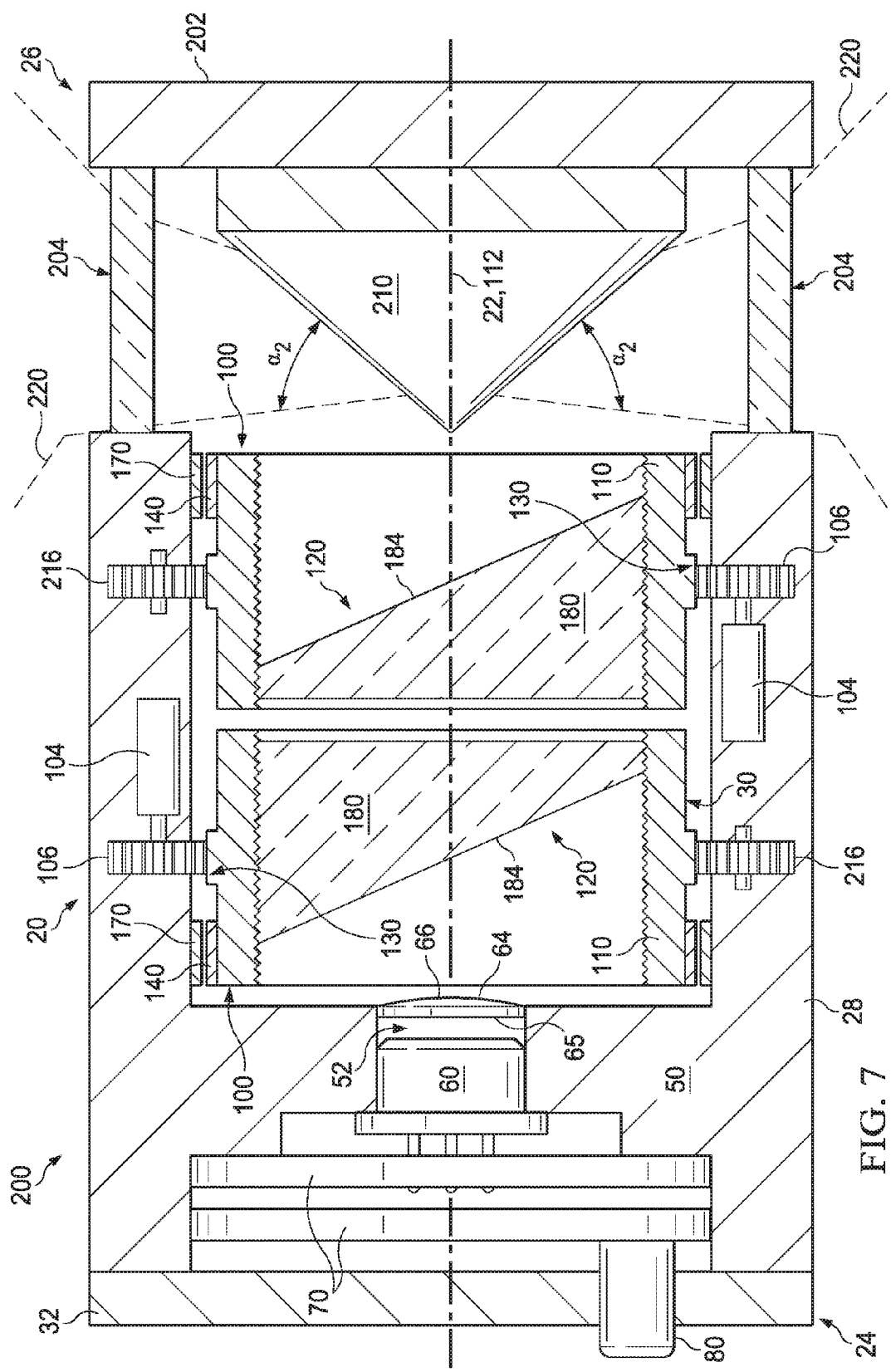
FIG. 7 illustrates a beam steering device that radially emits light.

FIG. 7 illustrates another example beam steering device 200. Features in FIG. 7 that are identical to features are FIGS. 1-5 are given the same reference number. The beam steering device 200 of FIG. 7 is configured to emit laser light in directions extending perpendicular to the centerline 22, also known as side-emitting. In this construction, both ends 24, 26 of the housing 20 are closed along the centerline 22. To this end, an end wall 202 is provided at the second end 26 of the housing 20. A non-planar mirror 210 is secured to the end wall 202 within the passage 30 and extends along the centerline 22 towards the wedge elements 100. In one example, the mirror 210 has a conical shape but could alternatively be hemispherical or have a polygonal shape. In any case, the mirror 210 is symmetric about the centerline 22.

A plurality of lateral openings 204 extends radially through the sidewall 28. The openings 204 are radially aligned with the mirror 210. A lens or window (not shown) can be provided in each opening 204. Light beams striking the mirror 210 are reflected radially away from the centerline 22 towards the openings 204. The prisms 180 can be rotated to a number of different positions relative to each other sufficient to generate a field of view for the beam steering device 200, illustrated by the pair of cones 220 in FIG. 7. In one instance, each cone 220 extends over an angle $\alpha_2$ of about 20°. The beam steering device 200 can therefore capture and measure objects within the viewing cones 220.

The beam steering device 200 operates in the same manner as the beam scanning device 16 except that the field of view 220 of the beam steering device 200 extends radially from the centerline 22 whereas the field of view 190 of the beam steering device 16 extends axially along the centerline 22. After the light beams strike the target object(s), the light passes through the openings 204, is reflected by the mirror 210 towards and through the prisms 180, through the lens 64, and ultimately reaches the transceiver 60, where it is collected and processed.

Similar to the beam steering device 16, the wedge elements 100 in the beam steering device 200 are also spaced entirely in both the axial and radial direction from one another along the centerline 22. No portion of one wedge element 100 radially overlaps a portion of the other wedge element 100. In other words, both ends 24, 26 of the rightmost wedge element 100 (as shown in FIG. 7) are positioned closer to the openings 204 than both ends 24, 26 of the leftmost wedge element 100. The wedge elements 100 therefore do not rotate within one another in use. Moreover, since the same bodies 30 are used for each wedge element 100 the inner diameters of the central passages 40 receiving the prisms 180 are the same.

Figure 8:
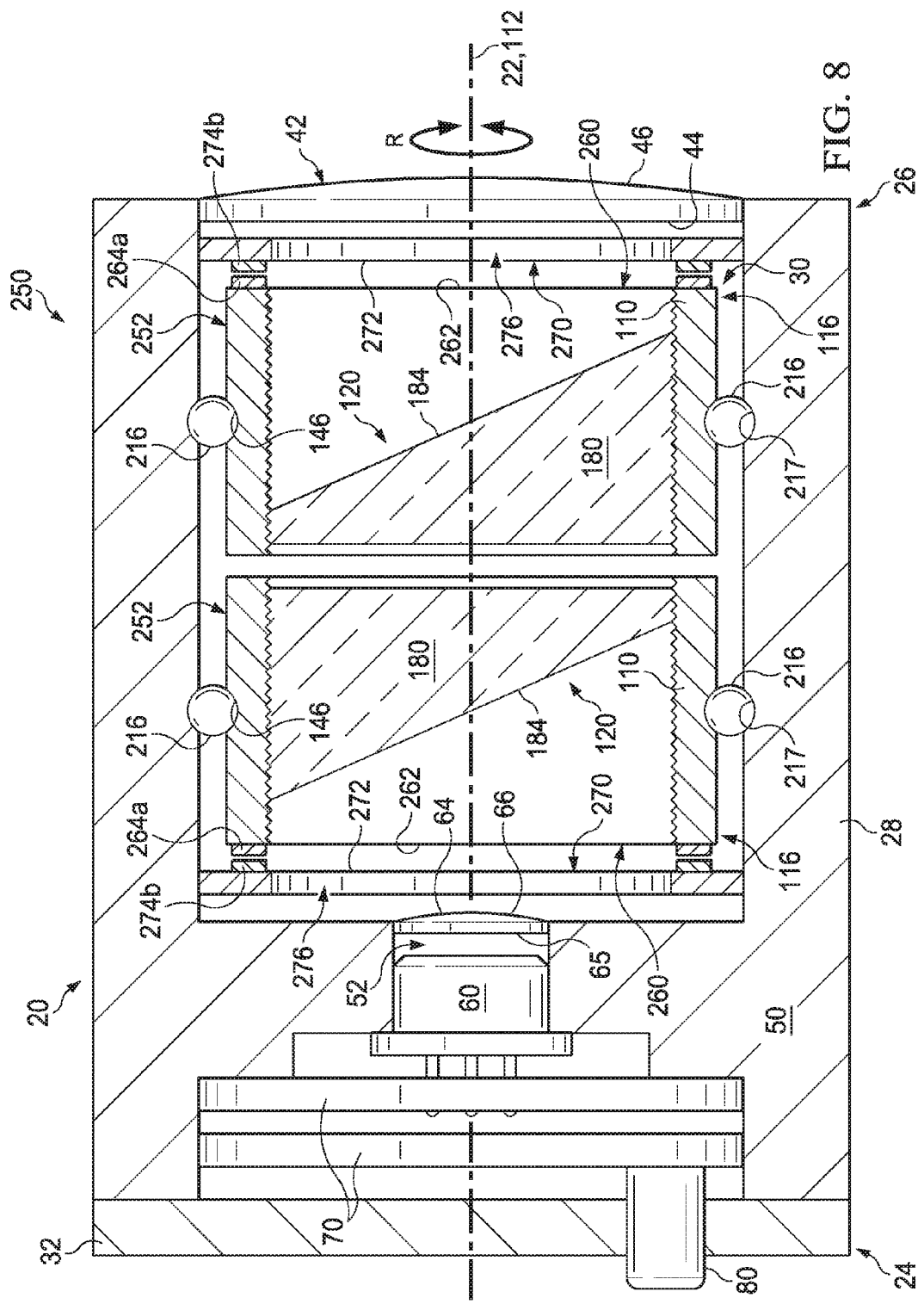
FIG. 8 illustrates another example drive element configuration for the wedge element.
Figure 9:
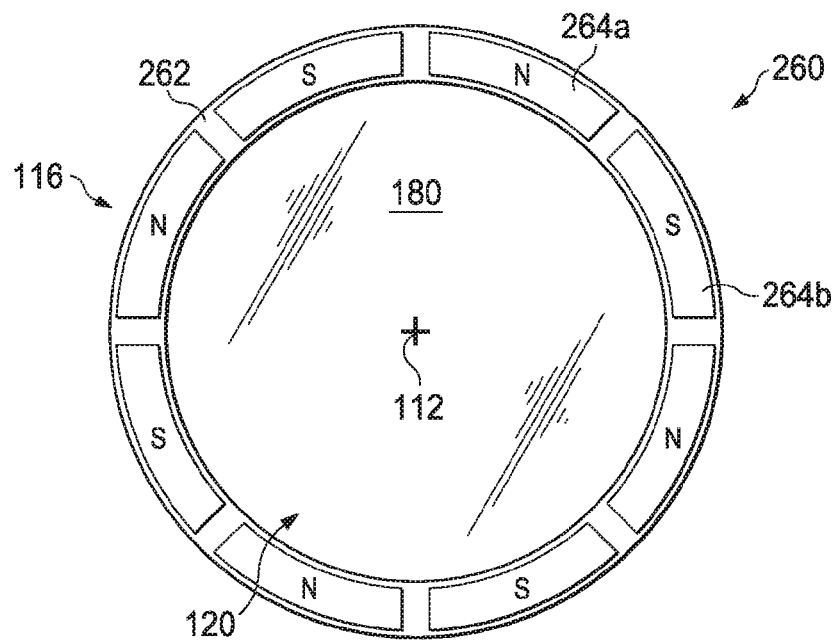
FIG. 9 illustrates a side view of a wedge element of FIG. 8.
Figure 10:
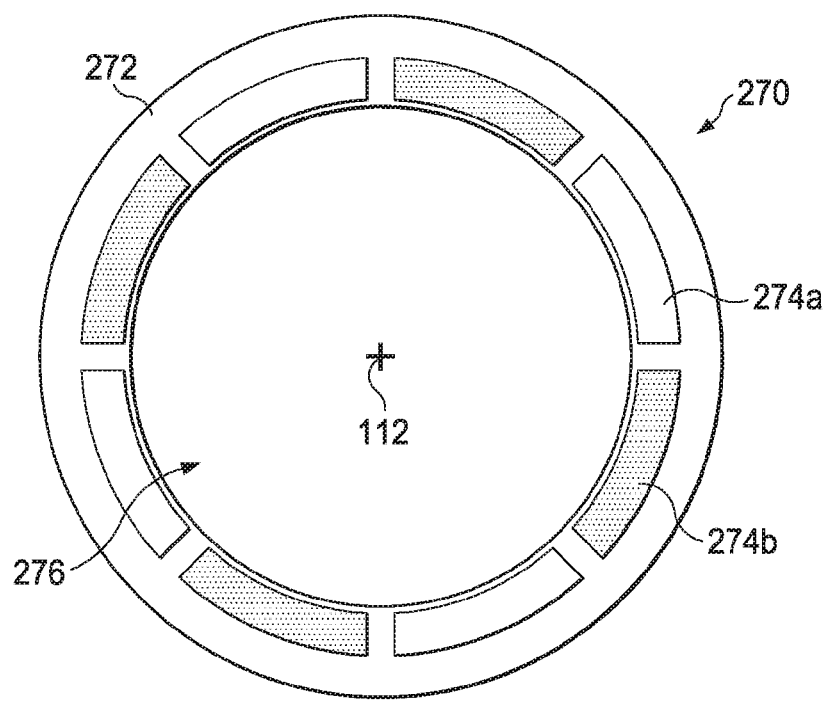
FIG. 10 illustrates a side view of a PCB of FIG. 8.

FIGS. 8-10 illustrate yet another example beam steering device 250. Features in FIGS. 8-10 that are identical to features are FIGS. 1-5 are given the same reference number. In this configuration, the beam steering device 250 includes multiple wedge elements 252 that are each configured with the drive member or drive member 260 positioned on an outer surface 262 of the body 110 at one of the ends 114, 116. As shown in FIGS. 8-9, the outer surface 262 is the axial end surface of the second end 116 of the body 110 extending substantially perpendicular to the axis 112. The drive member 260 constitutes a series of alternating magnets 264a, 264b phased 180° from one another. The magnets 264a, 264b are arranged in a circumferential pattern about the passage 120. The magnets 264a, 264b can be integrally formed on the outer surface 262 or attached to a strip or base member secured to the outer surface (not shown).

The drive member 260 cooperates with a PCB 270 secured to the housing 20 within the passage 30. The PCB 270 has an annular shape with a central opening 276 aligned with the centerline 22 for allowing beam light to pass therethrough in an unobstructed manner. The PCB 270 includes a plurality of magnetic drive coils 274a, 274b. The drive coils 274a, 274b are arranged in a circumferential pattern about the opening 276. The drive coils 274a, 274b can be integrally formed on the PCB 270, e.g., via printing, or attached to a strip or base member secured to the PCB (not shown). As shown, the drive coils 274a, 274b are integrally formed into a surface 272 of the PCB 270.

In the beam steering device 250 of FIG. 8 a pair of wedge elements 252 are provided therein. Similar to the beam steering devices 16, 200, the wedge elements 252 in the beam steering device 250 are also spaced entirely in both the axial and radial direction from one another along the centerline 22. No portion of one wedge element 252 radially overlaps a portion of the other wedge element 252. In other words, both ends 24, 26 of the rightmost wedge element 252 (as shown in FIG. 8) are positioned closer to the openings 204 than both ends 24, 26 of the leftmost wedge element 252. The wedge elements 252 therefore do not rotate within one another in use. Moreover, since the same bodies 30 are used for each wedge element 252 the inner diameters of the central passages 40 receiving the prisms 180 are the same.

The wedge elements 250 are oriented in the passage 30 such that the outer surfaces 262 face opposite directions. A PCB 270 associated with the leftmost wedge element 252 is secured to the housing 20 between that wedge element and the mirror 210, with the surface 272 facing the outer surface 262. A PCB 270 associated with the rightmost wedge element 252 is secured to the housing 20 between that wedge element and the lens 212, with the surface 272 facing the outer surface 262. Both PCBs 270 are spaced axially from their respective wedge element 252 and the openings 276 are centered on the centerline 22. During operation, the drive coils 274a, 274b on one or both PCBs 270 are energized to rotate the respective wedge element(s) 252 in the direction R to the desired positions about the centerline 22.

The PCBs 270 can be configured to include a position sensing structure, such as the encoder sensors 170, to sense rotation of the drive members 260. This position sensing structure can sense rotation of the magnets 264a, 264b on the body 110 or other encoding structure provided on the outer surface 262 (not shown). Alternatively, the second encoding member 84 and sensors 100 previously described can be used on an outer surface of the body 110 (not shown).

Referring to FIG. 8, the wedge elements 250 are rotatably mounted in the housing 20 by bearings 216 positioned radially between the bodies 110 and the sidewall 28 of the housing. In one example, the bearings 216 are located within an annular groove 146 extending along the entire circumference of the body 110 and an annular groove 217 extending along the entire circumference of the inner wall of the housing 20. The annular grooves 146, 217 and bearings 216 cooperate to maintain beam steering accuracy from the wedge elements 250.

Alternatively, the surfaces 272 of the PCBs 270 and the surfaces 262 of the bodies 110 can be modified to include bearing races to receive bearings such that the wedge elements 250 are axially supported for rotation in the housing 20 (not shown). In this construction, the axial end faces of the wedge elements 250 facing each other would also be provided with bearing tracks to allow bearings to extend between and connect the wedge elements to one another (also not shown). Such a configuration would allow the housing 200 to be reduced as a smaller radial clearance between the wedge elements 250 and inner housing wall would be needed for the axially mounted bearings.

The beam steering device disclosed herein is advantageous in that only a single optic unit—the monolithic transceiver—is needed to undertake the scan. Prior beam steering devices use multiple optic units, sometimes stacked linearly atop one another, to send and receive laser light. The prior constructions, however, are bulky, require many electrical connections, and are limited in the clarity of the scan performed. The transceiver, as disclosed herein, alleviates these concerns by implementing a laser, photodiode, and photodetector in a single, compact unit positioned along the centerline. The beam steering device further can be manufactured as to be advantageously small, compact, and can be readily scaled to meet nearly every automobile mounting configuration. In one example, the beam steering device can be scaled down to about a 1.5" diameter and be about 2" in length (front-emitting) or about 3" in length (side-emitting).

The wedge element disclosed herein is advantageous in that it produces a two-dimensional scanning pattern, compared to line scans common in many other devices. Furthermore, by positioning both the drive and position sensing structure on the outer surface of the device, i.e., the outer circumferential surface or outer axial surface, the wedge elements disclosed herein can be made more compact and efficient than other devices, for example, providing a space reduction of about ⅔ to about ¾ over such devices. This advantage is further realized by the non-overlapping positioning of the wedge elements within the housing.

These configurations also reduce the number of moving components and can eliminate the use of gears to drive the wedge elements, thereby reducing the packing complexity and simplifying the design. In other words, building the drive system around the body that retains the wedge reduces the footprint and complexity of the wedge element, which allows it to be adapted/sized for a wide range of applications, e.g., automotive LIDAR, occupancy sensing, and gaming. The wedge elements disclosed herein are also advantageous in that the same component, namely the camera, e.g., photodetector, is used to both emit and detect the laser light.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A beam steering device, comprising:
   a housing having at least one opening at an end, the at least one opening extending radially away from a centerline of the housing, and a conical mirror being positioned along the centerline to reflect light beams radially towards the at least one opening;
   a transceiver for emitting and receiving light beams through the at least one opening;
   a rotator including:
   a cylindrical body rotatably mounted within the housing axially between the transceiver and the at least one opening, the body extending along an axis and defining a central passage therethrough;
   a wedge-shaped prism secured to the body within the passage, the prism having a first surface extending perpendicular to the axis and a second surface extending transverse to the axis;
   an encoder member on an outer surface of the body; and
   a drive member on the outer surface of the body;
   an encoder sensor mounted to the housing to sense the encoder member and provide an encoder signal indicative of a rotational position of the prism about the axis; and
   a drive element mounted to the housing and arranged to apply motive force to the drive member to rotate the body and the prism about the axis for steering light beams propagating through the prism.

2. The device recited in claim 1, wherein the drive member includes a plurality of teeth formed in a radially outer surface of the body, and the drive element includes a motor and gear for engaging the teeth.

3. The device recited in claim 1, wherein the drive member includes a plurality of alternating magnetic poles, and the drive element includes a plurality of magnetic coils for energizing the magnetic poles.

4. The device recited in claim 1, wherein the at least one opening intersects the centerline of the housing.

5. The device recited in claim 1, wherein the drive member and the encoder member are integrally formed as one piece.

6. The device recited in claim 1, wherein the encoder member includes a strip of magnetic elements, and the encoder sensor includes a Hall-effect sensor.

7. The device recited in claim 1, wherein the prism includes threads for threadably engaging threads on an inner surface of the body.

8. The device of claim 1, wherein the outer surface includes an axial end surface of the body, and wherein the drive member includes an annular array of magnetic poles on the axial end surface about the passage, and wherein the drive element includes a plurality of coils axially spaced from the axial end surface.

9. A beam steering device, comprising:
   a housing having at least one opening at an end;
   a transceiver for emitting and receiving light beams through the at least one opening;
   a rotator including:
   a cylindrical body rotatably mounted within the housing axially between the transceiver and the at least one opening, the body extending along an axis and defining a central passage therethrough;
   a wedge-shaped prism secured to the body within the passage, the prism having a first surface extending perpendicular to the axis and a second surface extending transverse to the axis;
   an encoder member on an outer surface of the body, the outer surface including an axial end surface of the body, and the encoder member being on the axial end surface of the body about the passage; and
   a drive member on the outer surface of the body, the drive member including an annular array of magnetic poles on the axial end surface about the passage;

an encoder sensor mounted to the housing to sense the encoder member and provide an encoder signal indicative of a rotational position of the prism about the axis, the encoder sensor being on a PCB secured to the housing and spaced from the axial end surface to sense the encoder member; and a drive element mounted to the housing and arranged to apply motive force to the drive member to rotate the body and the prism about the axis for steering light beams propagating through the prism, the drive element including a plurality of coils axially spaced from the axial end surface.

10. A beam steering device, comprising:

a housing having at least one opening at an end;

a transceiver for emitting and receiving light beams through the at least one opening;

a first rotator including:
 a first cylindrical body rotatably mounted within the housing axially between the transceiver and the at least one opening, the first cylindrical body extending along an axis and defining a first central passage therethrough;
 a first wedge-shaped prism secured to the first cylindrical body within the first central passage, the first wedge-shaped prism having a first surface extending perpendicular to the axis and a second surface extending transverse to the axis;
 a first encoder member on an outer surface of the first cylindrical body; and
 a first drive member on the outer surface of the first cylindrical body;

a first encoder sensor mounted to the housing to sense the first encoder member and provide a first encoder signal indicative of a rotational position of the first wedge-shaped prism about the axis; and a first drive element mounted to the housing and arranged to apply motive force to the first drive member to rotate the first cylindrical body and the first wedge-shaped prism about the axis for steering light beams propagating through the first wedge-shaped prism;

a second rotator including:
 a second cylindrical body rotatably mounted within the housing, the second cylindrical body including a sidewall that extends between axially spaced apart ends, and the second cylindrical body defining a second central passage therethrough and being coaxial with the first cylindrical body, which is shared by the first central passage;
 a second wedge-shaped prism secured to the second cylindrical body within the second central passage, the second wedge-shaped prism having a first surface extending perpendicular to the axis and a second surface extending transverse to the axis;
 a second encoder member on an outer surface of the second cylindrical body; and
 a second drive member on the outer surface of the second cylindrical body;

a second encoder sensor mounted to the housing to sense the second encoder member and provide: a second encoder signal indicative of a rotational position of the second wedge-shaped prism about the axis; and an index signal providing a home pulse once per revolution indicative of an absolute rotational position; and a second drive element mounted to the housing and arranged to apply motive force to the second drive member, the first and second rotators being free from radial overlap with each other along a centerline of the housing.

11. A beam steering device, comprising:

a housing having at least one opening at an end;

a transceiver for emitting and receiving light through the at least one opening;

a pair of wedge elements, each including:
 a respective cylindrical body rotatably mounted within the housing, the body extending along an axis and defining a central passage therethrough;
 a respective wedge-shaped prism secured to the body within the passage, the prism having a first surface extending perpendicular to the axis and a second surface extending transverse to the axis;
 a respective encoder member on an outer surface of the body, the outer surface including an axial end surface of the body, and the encoder member being on the axial end surface of the body about the passage; and
 a respective drive member on the outer surface of the body, the drive member including an annular array of magnetic poles on the axial end surface about the passage;

an encoder sensor mounted to the housing to sense the encoder members and provide encoder signals indicative of rotational positions of the prisms about the axis, the encoder sensor being on a PCB secured to the housing and spaced from the axial end surfaces to sense the encoder members; and a drive element mounted to the housing and arranged to apply motive force to the drive members to rotate the bodies and the prisms about the axis for steering a beam of light propagating through the prisms, the drive element including multiple coils axially spaced from the axial end surfaces;

the prisms being individually rotatable to steer beams through the housing and being free from radial overlap with each other along a centerline of the housing.

12. The device recited in claim 11, wherein the drive member includes a plurality of teeth formed in a radially outer surface of the body, and the drive element includes a motor and gear for engaging the teeth.

13. The device recited in claim 11, wherein the drive member includes a plurality of alternating magnetic poles, and wherein the drive element includes a plurality of drive coils for energizing the magnetic poles.

14. The device recited in claim 11, wherein the at least one opening intersects the centerline of the housing.

15. The device recited in claim 11, wherein the at least one opening extends radially away from the centerline of the housing.

16. The device recited in claim 11, wherein the drive member and the encoder member are integrally formed as one piece.

* * * * *